Sept. 23, 1958    W. F. ALBRECHT    2,853,593
LAMP BASE WELDING
Filed Jan. 26, 1956

Inventor:
Warren F. Albrecht,
by George B. Kaiser
His Attorney.

United States Patent Office 2,853,593
Patented Sept. 23, 1958

2,853,593

LAMP BASE WELDING

Warren F. Albrecht, Euclid, Ohio, assignor to General Electric Company, a corporation of New York Application January 26, 1956, Serial No. 561,399

2 Claims. (Cl. 219—113)

My invention relates to the basing operation in the manufacture of electric lamps wherein a base is fastened to the constricted neck portion of the glass bulb and permanent electrical connections are made between the lead wires and the metal parts of the base, and more particularly to a circuit and method for welding side lead-in wires to the shell of the base.

In the past it has been the universal practice to effect the connection of the side lead-in wires to the base shell of electric lamps by means of a soldering operation. This was easily accomplished using brass base shells which are readily tinned and soldered. However, the recent trend has been toward lighter and less expensive metals, such as aluminum for example, which do not lend themselves readily to soldering. Methods and circuits were subsequently developed which rendered it desirable to weld the lead-in wire to the base shell even when using the easily solderable brass shells. The present invention is an improvement over the welding methods and circuits described in my U. S. Patent No. 2,708,702, issued May 17, 1955 and assigned to the assignee of the present invention, in which it is disclosed that a weld may be effected between a lead wire and a metal part of a lamp base, such as its shell, starting with a sealed bulb having a base seated on its neck and with the side lead-in wire drawn out between the edge of the shell and the seal shoulder. The lead-in wire is cut off to a short stub of substantial stiffness projecting a fraction of an inch from the edge of the base shell. The stub must be short enough to have the necessary stiffness for making a good contact with an electrode pressed against it and, since the wattage dissipated in the welding operation must be kept low in order to prevent excessive vaporization of metal with the resultant tendency to discolor and possibly crack the adjacent glass, the stub should be short in order not to require high wattage to fuse it. Further, the length of the stub must be such that when fused back into an approximately spherical globule welded to the edge of the base shell, the globule does not protrude excessively nor is so large as to be unsightly.

Prior to the actual welding operation, a relatively low resistance connection is made between the projecting stub and the metal part of the base to which it is to be welded. Thereafter a relatively massive electrode is pressed against the end of the stub and a welding current produced by a condenser discharge is passed through the stub, the circuit being completed through the shell of the base and a suitable electrode contacting it. The massive electrode which contacts the lead wire is made negative so that it operates as a cathode at the instant when the wire having fused, a spark is produced in that gap occurring between the electrode and the end of the wire.

This method and circuit proved highly satisfactory in welding side lead-in wires of incandescent lamps of regular or larger sizes on automatic, indexing turret, lamp making machinery having an indexing rate of about 1400 indexes per hour. However, when the welding circuit and method of my prior application was applied to miniature sized lamps on an indexing turret, having a substantially higher indexing rate, several problems were encountered. The higher indexing rate of miniature lamp making machinery results in a reduced dwell period at each work station. In addition, the lead-in wires of miniature lamps are of smaller diameter, such as 0.010 inch.

This combination of reduced dwell period and finer diameter lead-in wire results in failure of consistent arc starting to effect the side lead-in weld. Thus, an inordinately high number of miniature lamps must be rejected because the lead-in wires were not welded to the base shell or such weld was improperly made. In accordance with the present invention, I overcome these problems by providing a higher initial arc starting current of short duration. The initial current must be relatively high at the beginning of the welding cycle dropping rapidly as the cycle progresses so that the power expended is within the desired limits in order to prevent excessive metal vaporization and the resultant tendency to discolor and crack the glass lamp bulb. Variations in the voltage and values of the circuit components of the previously mentioned capacitor discharge welding circuit would not produce the desired effect. For example, increasing the applied D. C. voltage from 200 to 354 volts applied to a 1500 microfarad capacitor in the prior art circuit will produce a sufficiently high initial current for arc starting; however, the current does not drop rapidly enough, with the result that the wattage or power expended is excessively high attended by the previously mentioned base discoloration and bulb cracking. On the other hand, the normal 200 volt D. C. input applied to the previously mentioned circuit in which the capacitance was increased from 1500 to 2400 microfarads failed to produce the desired initial current for arc starting. Variations in the applied voltage and/or the capacitance of the circuit between the values mentioned either failed to produce sufficiently high initial current for arc starting or, if the current was sufficiently high, resulted in the expenditure of excessive power with its attendant difficulties.

It is, therefore, an object of the present invention to provide a circuit and method for welding side lead-in wires to the base shells of miniature type lamps wherein consistent arc starting and complete welding is effected in a relatively short period of time.

It is a further object of the present invention to provide a welding circuit which produces a high initial arc starting current of short duration and low power requirements.

In accordance with the invention, I provide a circuit for welding side lead-in wires to the base shell of miniature lamps suitable for use on high-speed, indexing turret, lamp basing machines which comprises a source of D. C. current having a main capacitor connected in parallel with said source and a secondary or minor capacitor in parallel with the main capacitor. A pair of electrodes is connected in parallel with said capacitor. The negative electrode for contacting the lead wire stub is massive relative to said stub and the positive electrode is adapted to contact the base shell to complete the electrical circuit. A switch is included in the circuit to interrupt the D. C. current source prior to contacting the work with the electrode.

The invention will be described in conjunction with a rectifier type source of direct current capable of developing a potential of approximately 200 volts D. C. It will be understood, however, that any suitable source of direct current capable of providing the desired potential may be used in conjunction with the circuit of my invention.

Figure 1:
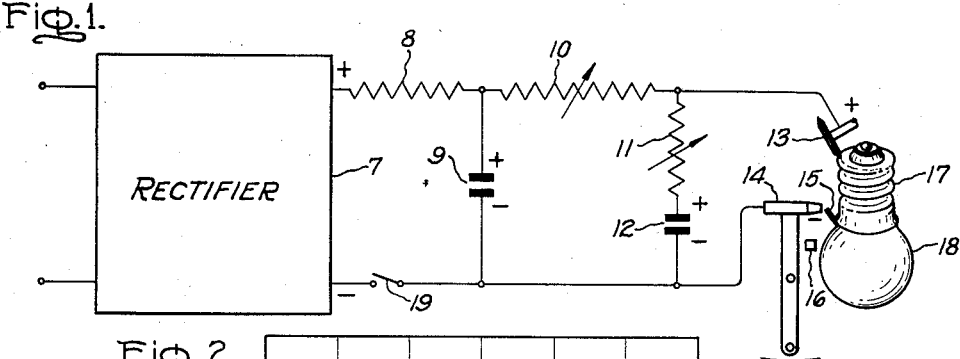
Fig. 1 is a schematic diagram of a welding circuit according to my invention and also showing electrodes in proper position to effect the side lead-in wire weld of a miniature lamp.

Referring to the drawings, Fig. 1 shows the rectifier source of direct current 7, a limiting resistor 8 in the positive side of the rectifier output for limiting the charging current to the rated value of the rectifier tube to prevent overloading of the tube. A main capacitor 9 is connected in parallel with the output terminals of the rectifier and stores the main welding current. A variable resistor 10 is connected in series with limiting resistor 8 and the positive terminal of the rectifier to control the rate of discharge or welding current from the main capacitor 9. Variable resistance 11 and secondary or minor capacitor 12 connected in series with each other are located in the circuit in parallel with main capacitor 9. Secondary capacitor 12 stores and provides the secondary source of welding current which, upon simultaneous discharge with main capacitor 9, is superimposed upon the current from capacitor 9 to provide the total welding current. Variable resistor 11 controls the rate of discharge of welding current from secondary capacitor 12. Electrode 13 is connected to the positive side of the circuit and adapted to contact the base shell of a miniature lamp when said lamp is indexed into position at the welding work station. Massive electrode 14 is connected to the negative side of the welding circuit and adapted to be advanced to contact the lead wire 15 to be welded. Stop 16 halts the advance of massive electrode 14 after contact is made so that melting of the lead wire away from the electrode will result in the formation of an electrical arc, thereby completing the weld. A lamp is shown in position at the welding work station with positive electrode 13 contacting the base shell 17 of the lamp and negative electrode 14 in position to be advanced to contact the stub of the lead wire 15 to be welded. It is during the contacting of the lead wire stub 15 with the massive electrode 14 that excessive power in the circuit results in metal vaporization which discolors or cracks the glass lamp bulb 18. Provision must also be made to interrupt the D. C. current source prior to contacting the lead wire 15 with massive electrode 14. Means to interrupt the source current may consist of a switch operated in conjunction with the forward movement of the negative electrode 14 so that the switch is open prior to contacting the lead wire 15 with said negative electrode. In Fig. 1 a switch 19 is shown in the negative side of the circuit immediately adjacent the output terminal of the rectifier.

Prior art lamp finishing or basing machinery, as disclosed for instance in U. S. Patent 1,708,756, Fagan, comprises a turret or turn-table and suitable driving means for intermittently rotating the turret in a counterclockwise direction. The glass bulbs are held in holders or heads fastened to the turret around its periphery, and intermittent rotation of the turret advances the bulbs to successive work stations at each index. The welding head is located adjacent one work station and the weld is completed during a single dwell period of the intermittent indexing. When such machinery indexes at the customary rate of 1400 indexes per hour, the welding circuit of my patent previously referred to will produce consistent arc starting on contacting the lead wire stubs with the negative electrode and complete welding of the stub to the base shell. However, in line with the recent trend to increase the production rate of automatic, indexing turret, lamp making machinery, an increase in indexing rate is desired.

Since the weld is completed at a single work station and during one dwell period of the indexing turret, the increase in indexing rate results in a reduction in dwell period or reduced time in which to complete the weld.

Figure 3:
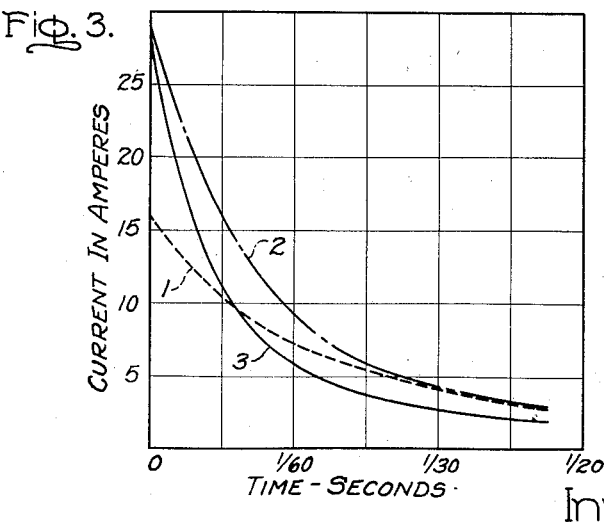
Fig. 3 is a series of curves of current vs. time showing the current output for a given period achieved by variations in the circuit components of the prior art circuits.

Variations in the applied voltage and other values of the circuit components of my patented circuit failed to reduce lamp shrinkage. For example, curve 2 of Fig. 3 shows that the initial high arc starting current desired may be obtained by raising the D. C. voltage applied to the circuit from 200 to 354 volts, the value of the capacitor in the patented circuit remaining at 1500 microfarads. However, considering the area under the curve as proportional to the power expended, it can be seen that a considerable increase in power results from this change and it was discovered that the attendant difficulties of metal vaporization and discoloration and cracking of the lamp bulb resulted. Curve 1 of Fig. 3 shows the effect of increasing the capacitance of the circuit to 2400 microfarads maintaining the original voltage of 200 volts D. C. It is obvious from this curve that the initial arc starting current at the instant of contact of the electrode and the lead wire stub is much too low to result in consistent arc starting. Curve 3 of Fig. 3 represents the current output of the circuit of the present invention. It can be seen that the desired initial high current is obtained and, the area under each curve being proportional to power consumption, it is shown that curve 2 represents approximately 35% more power expended than curve 3.

Figure 2:
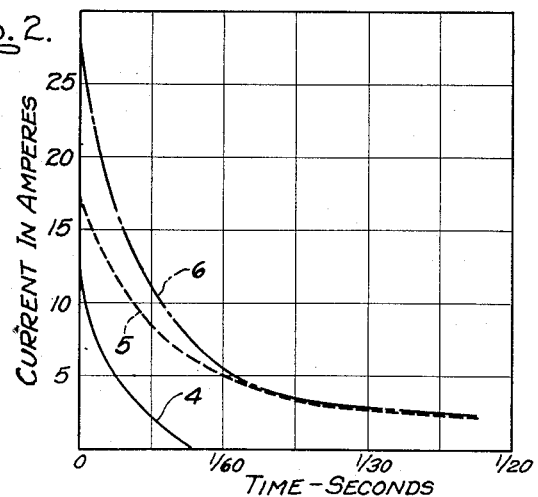
Fig. 2 is a series of curves of current vs. time showing the current output of the individual capacitors and the combined or total current output of both capacitors in my circuit.

In Fig. 2 are shown the output characteristics of the separate components of the circuit of the present invention. Curve 5 represents the characteristics of the main capacitor 9 of the circuit and curve 4 represents the output of the secondary capacitor 12 of the circuit of my invention. The simultaneous discharge of these capacitors, when the lead wire stub is contacted by the negative electrode, results in the high initial current and low power consumption shown in curve 6 of Fig. 2 also illustrated by curve 3 of Fig. 3.

Thus, to provide rapid and complete welding of .010" copper clad iron lead-in wire to a copper base shell of a miniature lamp during a cycle or dwell period of less than 2 seconds, the following preferred circuit values are given by way of example. It will be noted that the cycle or dwell period referred to above is the total elapsed time from the instant the lamp is indexed into position at the welding work station to the instant before the lamp is indexed to the next station.

Preferred circuit values are 200 volts D. C. source voltage; 25 ohms resistance at resistor 8; 1500 microfarads at main capacitor 9; 0–15 ohms variable resistor 10 set at 7 ohms; 300 microfarads at secondary capacitor 12; and 0–10 ohm variable resistor 11 set at 5 ohms. It will be appreciated that main capacitor 9 and secondary (minor) capacitor 12 may consist of banks of two or more capacitors of lesser value the sum of their capacitance being equal to the preferred values given for said main and minor capacitors.

Variation in circuit values is possible without significant change in the desired results. For example, the source voltage may be increased to 240 volts D. C., the limiting resistor 8 increased to 45 ohms, main power resistor 10 set at 13 ohms, the secondary power resistor 11 at 1 ohm with the main power capacitor 9 and secondary capacitor 12 remaining at 1500 and 300 microfarads, respectively. Those skilled in the art will readily perceive the circuit value changes necessary to produce the desired results in welding lead wires of different diameter to base shells of other metals and alloys.

Although a preferred embodiment of my invention has been disclosed, it is recognized that variations and changes may be made therein within the spirit and scope of the invention as defined by the appended claims. It is understood further that the source current and circuit values as given and also the power requirements and time can be varied, independently and in relation to each other, within fairly wide limits to obtain the desired results.

What I claim as new and desire to secure by Letters Patent of the United States is:

1. A welding circuit comprising a source of direct current, electrodes connected to said source, means to contact both said electrodes with the work, at least one condenser connected between and in parallel with said source and said electrodes, at least one additional condenser of relatively smaller capacity than said first condenser connected between and in parallel with the first condenser and said electrodes and adapted to be charged by a temporary flow of charging current from said source simultaneously with said first condenser and simultaneously discharged with said first condenser in the absence of source current by contacting the pieces to be welded with said electrodes and means for interrupting the flow of current from said sources prior to contacting of said electrodes with the work.

2. A welding circuit comprising a source of direct current, electrodes connected to said source, at least one condenser connected between and in parallel with said source and said electrodes, at least one additional condenser of relatively smaller capacity than said first condenser connected between and in parallel with the first condenser and said electrodes and adapted to be charged by a temporary flow of current from said source simultaneously with said first condenser and further adapted to be simultaneously discharged with said first condenser in the absence of source current by contacting the pieces to be welded with said electrodes, variable resistors connected in series with said condensers in the discharge path thereof and adapted to control the flow of welding current upon discharge of said condensers, and means for interrupting the flow of current from said source.

References Cited in the file of this patent

UNITED STATES PATENTS

| | | |
|---|---|---|
| 1,613,957 | Madden | Jan. 11, 1927 |
| 2,184,628 | Watson et al. | Dec. 26, 1939 |
| 2,508,103 | Dawson | May 16, 1950 |

FOREIGN PATENTS

| | | |
|---|---|---|
| 718,686 | Great Britain | Nov. 17, 1954 |